(12) United States Patent
Mahadevan et al.

(10) Patent No.: US 11,070,424 B2
(45) Date of Patent: Jul. 20, 2021

(54) SYSTEM AND METHOD FOR DYNAMIC NAME CONFIGURATION IN CONTENT-CENTRIC NETWORKS

(71) Applicant: CISCO TECHNOLOGY, INC., San Jose, CA (US)

(72) Inventors: Priya Mahadevan, Sunnyvale, CA (US); Glenn C. Scott, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 719 days.

(21) Appl. No.: 15/650,402

(22) Filed: Jul. 14, 2017

(65) Prior Publication Data
US 2017/0317885 A1 Nov. 2, 2017

Related U.S. Application Data

(63) Continuation of application No. 14/242,744, filed on Apr. 1, 2014, now Pat. No. 9,716,622.

(51) Int. Cl.
*H04L 12/24* (2006.01)
*H04L 29/12* (2006.01)
*H04L 12/741* (2013.01)
*H04L 12/715* (2013.01)
*H04L 12/751* (2013.01)
(Continued)

(52) U.S. Cl.
CPC .......... *H04L 41/0816* (2013.01); *H04L 45/02* (2013.01); *H04L 45/04* (2013.01); *H04L 45/14* (2013.01); *H04L 45/54* (2013.01); *H04L 45/74* (2013.01); *H04L 45/7453* (2013.01); *H04L 61/1582* (2013.01); *H04L 61/303* (2013.01)

(58) Field of Classification Search
CPC ....... H04L 67/327; H04L 67/16; H04L 45/38; H04L 45/20; H04L 45/74
See application file for complete search history.

(56) References Cited

U.S. PATENT DOCUMENTS

2007/0275701 A1 11/2007 Jonker
2011/0090908 A1* 4/2011 Jacobson ................ H04L 45/54
370/392

(Continued)

FOREIGN PATENT DOCUMENTS

CN 103095724 A 5/2013
EP 2562978 A1 2/2013

OTHER PUBLICATIONS

Extended European Search Report in counterpart European Application No. 15160676.1, dated Aug. 27, 2015, 7 pages.
(Continued)

*Primary Examiner* — Barbara B Anyan

(57) ABSTRACT

One embodiment of the present invention provides a system for automatic configuration of a computing device in a content-centric network (CCN). During operation, the system sends, by the computing device on at least one of the computing device's faces, an interest in configuration information. The interest has a predetermined name prefix. The system then receives a content object in response to the interest. The content object includes at least a default name prefix, to which the computing device can send other interests. The system further configures the computing device based on the received content object.

20 Claims, 6 Drawing Sheets

(51) Int. Cl.
*H04L 12/721* (2013.01)
*H04L 12/743* (2013.01)

(56) References Cited

U.S. PATENT DOCUMENTS

| | | | |
|---|---|---|---|
| 2012/0173765 A1* | 7/2012 | 't Hooft | H04B 5/0056 710/8 |
| 2012/0317307 A1* | 12/2012 | Ravindran | H04N 21/64746 709/238 |
| 2013/0219081 A1* | 8/2013 | Qian | H04L 45/02 709/241 |
| 2014/0129437 A1* | 5/2014 | Desai | G06Q 20/322 705/41 |
| 2014/0192717 A1* | 7/2014 | Liu | H04L 67/16 370/328 |
| 2015/0036535 A1* | 2/2015 | Mosko | H04L 45/04 370/254 |
| 2015/0117453 A1* | 4/2015 | Mosko | H04L 45/7453 370/392 |
| 2015/0134612 A1* | 5/2015 | Silberstein | G06F 16/27 707/634 |
| 2015/0163127 A1* | 6/2015 | Garcia-Luna-Aceves | H04L 45/14 709/242 |
| 2016/0072667 A1* | 3/2016 | Zhu | H04L 41/0803 709/220 |

OTHER PUBLICATIONS

Beichuan, "NDN-Routingiccnx-dhcp," https://github.com/NDN-Routing/ccnx-dhcp, Feb. 10, 2012, 2 pages.

Xie, et al., "Scale Content Centric Networks via Reactive Routing," 2013 IEEE International Conference on Communications (ICC), Jun. 2013, 6 pages.

CCNx.org, "CCNx Protocol," http://www.ccnx.org/releases/latest/doc/technical/CCNxProtocol.html, Mar. 2, 2012, 6 pages.

English translation of the First Office Action in counterpart Chinese Application No. 20150119100.0, dated Feb. 22, 2019, 10 pages.

* cited by examiner

SYSTEM AND METHOD FOR DYNAMIC NAME CONFIGURATION IN CONTENT-CENTRIC NETWORKS

RELATED APPLICATIONS

This is a continuation patent application of (and claims the benefit of priority under 35 U.S.C. § 120) of U.S. application Ser. No. 14/242,744, issued as U.S. Pat. No. 9,716,622, filed Apr. 1, 2014, entitled "SYSTEM AND METHOD FOR DYNAMIC NAME CONFIGURATION IN CONTENT-CENTRIC NETWORKS," by inventors Priya Mahadevan, et al. The disclosure of the prior application is considered part of and is incorporated by reference in the disclosure of this application in its entirety.

The subject matter of this application is related to the subject matter in the following applications:

U.S. patent application Ser. No. 14/242,761, entitled "SYSTEM AND METHOD FOR DEVICE REGISTRATION AND DISCOVERY IN CONTENT-CENTRIC NETWORKS," by inventor Priya Mahadevan, filed Apr. 1, 2014; and U.S. patent application Ser. No. 14/250,325, issued as U.S. Pat. No. 9,451,032, entitled "SYSTEM AND METHOD FOR SIMPLE SERVICE DISCOVERY IN CONTENT-CENTRIC NETWORKS," by inventors Glenn Scott and Marc E. Mosko, filed Apr. 10, 2014; the disclosures of which are herein incorporated by reference in their entirety.

BACKGROUND

Field

The present disclosure relates generally to a content-centric network (CCN). More specifically, the present disclosure relates to a system and method for dynamic name configuration in content-centric networks (CCNs).

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on end-host addresses. That is, a consumer of content can only receive the content by explicitly requesting the content from an address (e.g., IP address or Ethernet media access control (MAC) address) that is typically associated with a physical object or location. This restrictive addressing scheme is becoming progressively more inadequate for meeting the ever-changing network demands.

Recently, information-centric network (ICN) architectures have been proposed in the industry where content is directly named and addressed. Content-Centric Networking (CCN), an exemplary ICN architecture brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In CCN, names play an important role. More specifically, content objects and Interests are identified by their names, which is typically a hierarchically structured variable-length identifier (HSVLI). Interests and content objects flow through the network based on their names. When a computing device first joins a CCN network, it needs to know where to forward Interest messages, and it also needs to know what name or name prefix to include in the Interest message that needs to be sent in order to obtain basic services in the new environment. Hence, in order for a device to operate correctly in a CCN, initial configurations of CCN namespaces are essential.

SUMMARY

One embodiment of the present invention provides a system for automatic configuration of a computing device in a content-centric network (CCN). During operation, the system sends, by the computing device on at least one of the computing device's faces, an interest in configuration information. The interest has a predetermined name prefix. The system then receives a content object in response to the interest. The content object includes at least a default name prefix, to which the computing device can send other interests. The system further configures the computing device based on the received content object.

In a variation on this embodiment, the content object further includes one or more namespaces that correspond to one or more services.

In a further variation, the services include one or more of: a device registration service, a device discovery service, a service discovery service, a name resolution service, a service for obtaining or certifying signing keys, and a printing service.

In a variation on this embodiment, the system further broadcasts the interest on all of the computing devices' faces.

In a variation on this embodiment, the system further receives, from a peer computing device, a second content object in response to the interest. The second content object includes redirection information to a configuration service, thereby facilitating the computing device to send an additional interest to the configuration service.

In a variation on this embodiment, the content object further includes a lease time associated with at least one of the namespaces, indicating a predetermined time within which the at least one of the namespaces remain valid.

In a further variation, the system resends the interest before a termination of the lease time.

In a variation on this embodiment, the content object further includes a namespace associated with additional configuration information, thereby facilitating the computing device to send a subsequent interest in the additional configuration information.

One embodiment of the present invention provides a system for automatic configuration of a computing device in a content-centric network (CCN). During operation, the system listens, by a configuration server, for an interest message on a predetermined namespace. In response to receiving the interest message, the system generates a content object, which includes at least a default name prefix, to which the computing device can send other interests. The system then sends the content object to the computing device, thereby facilitating configuration of the computing device based on the content object.

BRIEF DESCRIPTION OF THE FIGURES

In the figures, like reference numerals refer to the same figure elements.

DETAILED DESCRIPTION

Overview

Figure 1:
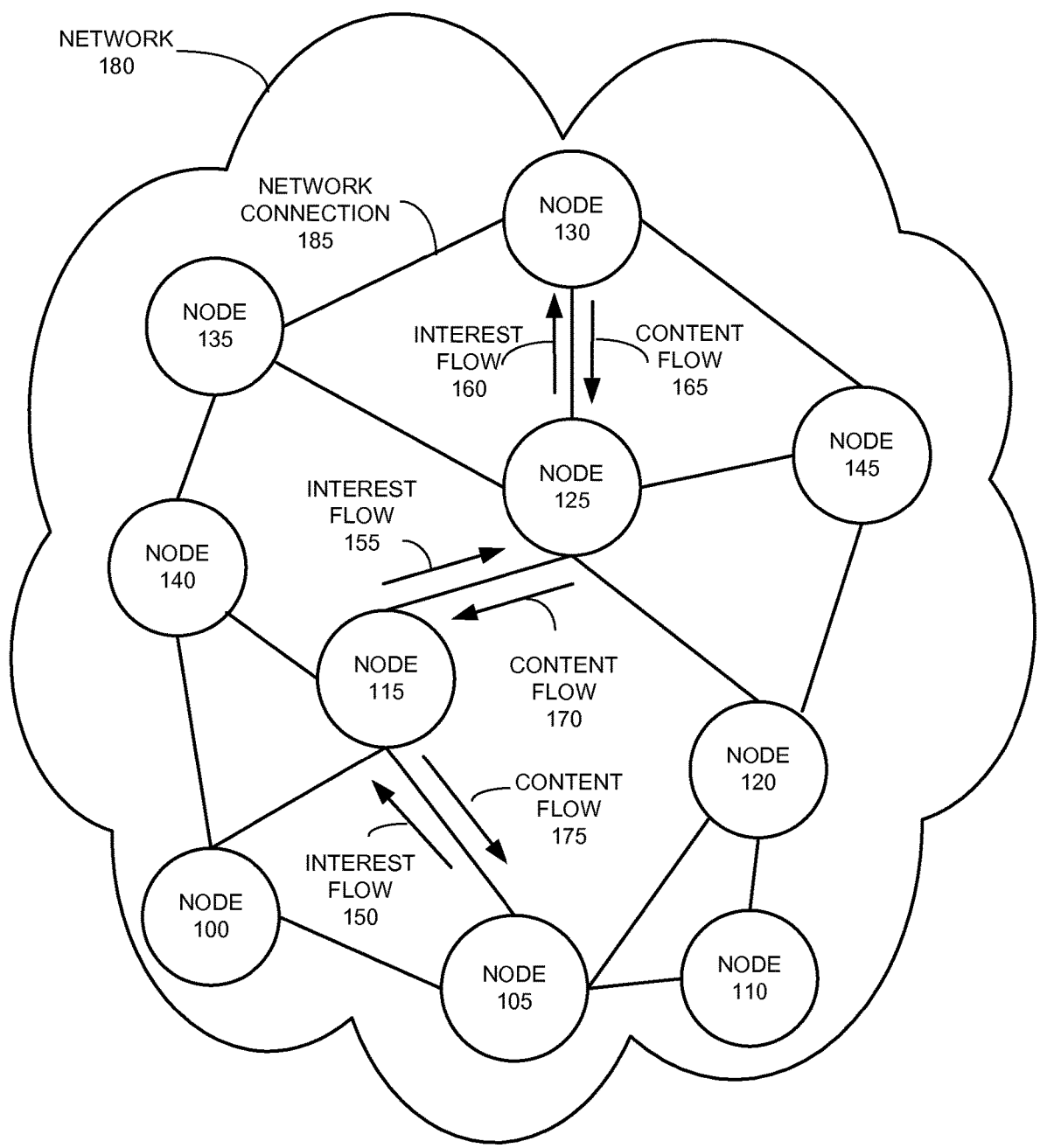
FIG. 1 illustrates an exemplary architecture of a network, in accordance with an embodiment of the present invention.

Embodiments of the present invention provide a system and method for dynamically configuring a device with appropriate namespaces when the device joins a CCN network. More specifically, when a device is introduced to a new CCN environment, it is pre-configured to broadcast an interest, such as a neighbor-discovery message or a "hello" message, with a pre-determined name prefix (corresponding to a pre-determined namespace) to all of its faces. A dynamic namespace configuration protocol (DNCP) service is listening for such interest messages on the pre-determined namespace. In response to receiving such an interest message, the DNCP service sends back a content object that includes appropriate information for configuring the namespace on the device. The configuration information includes, but is not limited to: initial forwarding information base (FIB) entries, namespace for device registration and discovery, namespace for service discovery, namespace for key services, etc.

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple Interests for the same name, it may aggregate those Interests. A network element along the path of the Interest with a matching Content Object may cache and return that object, satisfying the Interest. The Content Object follows the reverse path of the Interest to the origin(s) of the Interest. A Content Object contains, among other information, the same HSVLI, the object's payload, and cryptographic information used to bind the HSVLI to the payload.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also the HSVLO may not be human readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSV-LIs can be found in U.S. Pat. No. 8,160,069, entitled "SYSTEM FOR FORWARIDNG A PACKET WITH A HIERARCHICHALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and optionally other requested parameters such as publisher key-ID match) satisfies the Interest.

"Content Object:" A data object sent in response to an Interest. It has an HSVLI name and a Content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed.

"Face:" In CCN, the term face is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an Interest in that content by the content's name. An Interest in a piece of content can be a query for the content according to the content's name or identifier. The content, if available in the network, is sent back from any node that stores the content to the requesting node. The routing infrastructure intelligently propagates the Interest to the prospective nodes that are likely to have the information and then carries available content back along the reverse path traversed by the Interest message. Essentially the Content Object follows the breadcrumbs left by the Interest message and thus reaches the requesting node.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate Interest or originate content.

In accordance with an embodiment of the present invention, a consumer can generate an Interest for a piece of content and forward that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (Interest flow 150) to node 115, which does not have the content available. Next, the Interest flows (Interest flow 155) from node 115 to node 125, which again does not have the content. The Interest then flows (Interest flow 160) to node 130, which does have the content available. The flow of the Content Object then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

In CCN, each node maintains three major data structures, including a Forwarding Information Base (FIB), a Content Store (CS), and a Pending-Interest Table (PIT).

FIB is used to forward Interest packets toward potential source(s) of matching Content Objects. Typically, a routing protocol is used to populate the FIB among all nodes in the network. The FIB entries are often indexed by the name prefixes, with each entry including a physical address of at least one face to which the matching Interest should be forwarded. While forwarding Interest messages, longest-prefix-match lookups of names are performed at the FIB to find a matching entry.

Content Store (CS) is similar to the buffer memory used in an IP router. More particularly, CS temporarily buffers Content Objects that pass through this node, allowing efficient data retrieval by different consumers. When a router receives an Interest packet, it first checks whether there is a matching Content Object in its content store.

Pending Interest Table (PIT) keeps track of Interests forwarded upstream toward content source(s) so that a returned Content Object can be sent downstream to its requester(s). In CCN, only Interest packets are routed. The returning Content Object follows the trail of the Interest packet back to the content requester. A PIT entry for an Interest specifies the name of the Interest and one or multiple incoming faces that requested that Interest.

When an Interest packet arrives on a certain face, a longest-match lookup is done based on the content name, or the HSVLI. The index structure used for the name lookup is ordered in such a way that a CS match will be preferred over a PIT match, which will be preferred over an FIB match. Hence, if there is already a Content Object in CS that matches the Interest, the Content Object will be sent out via the face the Interest arrived on and the Interest will be discarded. Otherwise, the PIT will be checked to see if a match can be found. If so, the Interest's arrival face will be added to the PIT entry's requesting face list and the Interest will be discarded. Otherwise, the FIB will be checked and the Interest is forwarded along the one of more faces listed in the matching FIB entry.

Dynamic Namespace Configuration

As described previously, in CCN, packets (which include Interests and Content Objects) flow through the network based on their name prefix. When a device was initialized (either for the first time ever or when it joins a network), the device needs to notify other devices in the network of its existence and to notify network routers the physical addresses of its faces. For example, when a sensor (such as a thermometer) is installed in a home for the first time, the sensor needs to be configured in order to know where to send its data. Similarly, when a laptop or a tablet computer is moved from a home environment to a coffee shop, the computer needs to know to where to send its Interest and to optionally let other devices on the network know how to reach it. Although it is possible to manually configure the devices during initialization, existing CCN protocols lack solutions for automated device initialization.

In the existing Internet Protocol (IP) network, Dynamic Host Configuration Protocol (DHCP) is used for dynamically distributing network configuration parameters, such as IP addresses for interfaces and services. More specifically, DHCP allows computers to request IP addresses and networking parameters automatically from a DHCP server, reducing the need for a network administrator or a user from having the configuring these settings manually. A similar mechanism is needed in CCN to initialize a device when the device comes online for the first time or when it is introduced to a new environment. More specifically, in order for a device to function properly in a CCN network, the device needs to know where to send Interest packets for receiving certain services. Because CCN relies on name prefix to move packets, the initial configuration of a device will involve configurations of namespaces. For example, the device may need to set up default forwarding information (which can include one or more appropriate entries) in its FIB, or to configure namespaces of various services such that requests (in the form of Interests) to these services are appropriately forwarded. In addition, in order to obtain the services, the device needs to know the name or the name prefix to be included in the appropriate Interest messages. Examples of the services may include, but are not limited to: device registration, service discovery, certification services for authorizing keys, etc.

In order to provide a automated solution for device initialization, in some embodiments, the system implements a dynamic namespace configuration protocol (DNCP) to automatically configure a device with namespaces that are required for proper functioning of the device, such as default forwarding entries, namespace of device registration and discovery service, and namespace of a name resolution (indirection) service, etc. Note that in order for the DNCP to work, the following conditions need to be met. First, each device needs to run a basic CCN stack and is capable of generating and processing CCN Interests and Content Objects. Second, the devices are either manually configured or are automatically capable of establishing underlying network connectivity (which can include, but are not limited to: Ethernet, WiFi, Bluetooth, etc.). Third, each device needs to be provided with a manufacturer-supplied, unique device identifier, which is analogous to the media access control (MAC) address. Note that such a device ID can be 16 or 32 bytes long, or can have an arbitrary length. In addition, it can take any forms that are defined by the device manufacturer. For example, each temperature sensor made by a particular manufacture may have a unique ID issued by the manufacturer. In addition, each device needs to be pre-loaded with a signing key, such as a public-private key pair, a symmetric key, or any other signing key that confirms with CCN requirements, in order to sign Content Objects that it would like to publish. If a device is not pre-configured with such keys, the DNCP service needs to direct the device to an appropriate service to obtain or certify its keys by specifying the name of this service.

Figure 2:
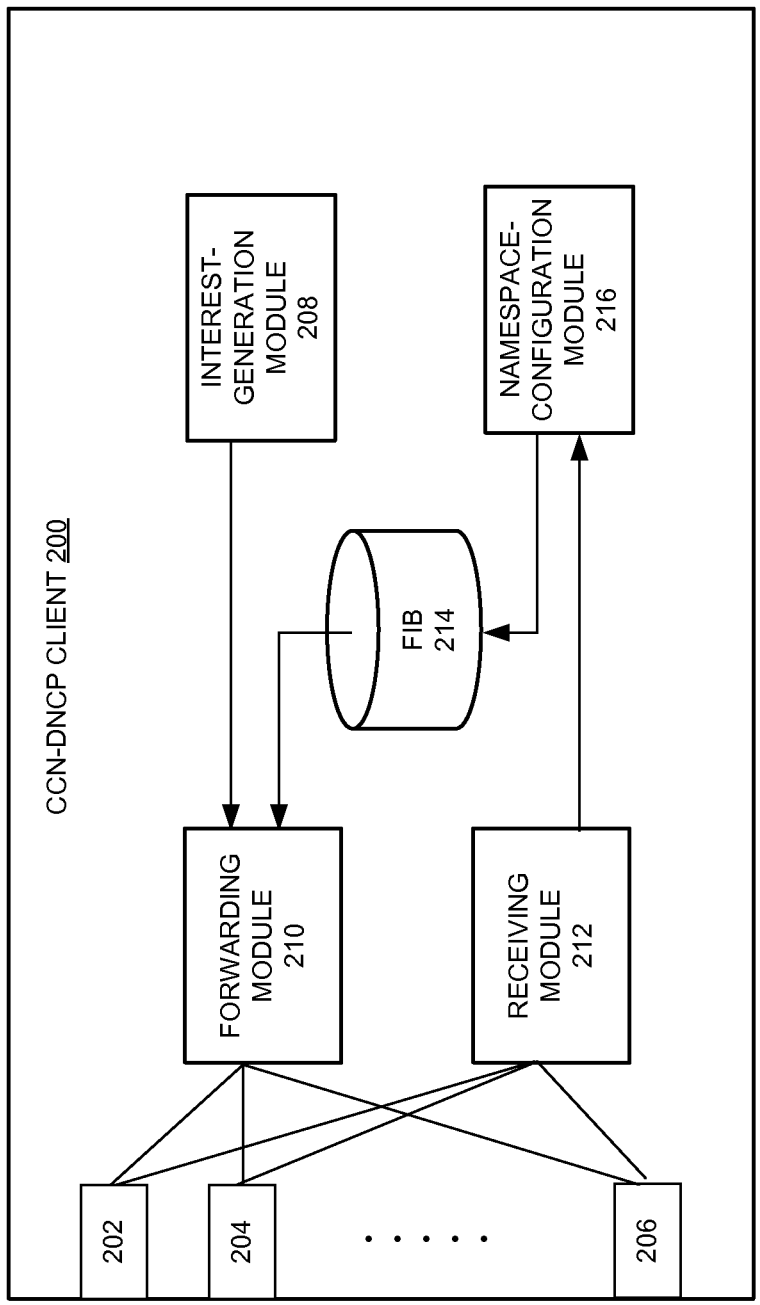
FIG. 2 presents a diagram presenting an exemplary architecture of a CCN dynamic namespace configuration protocol (DNCP) client, in accordance with an embodiment of the present invention.

FIG. 2 presents a diagram presenting an exemplary architecture of a CCN dynamic namespace configuration protocol (DNCP) client, in accordance with an embodiment of the present invention. In FIG. 2, CCN-DNCP client 200 includes a plurality of faces, such as faces 202, 204, and 206; an Interest-generation module 208; a forwarding module 210; a receiving module 212; a forwarding information base (FIB) 214; and a namespace configuration module 216.

Faces 202-206 can include not only physical interfaces but also application processes capable of sending and receiving packets. Interest-generation module 208 is responsible for generating Interest packets, which can be requests to content or services. In some embodiments, Interest-generation module 208 is configured to generate a "HELLO" Interest message, which can be used for requesting DNCP services. In further embodiments, the "HELLO" Interest message is generated in a pre-determined namespace. In other words, the system may predefine and reserve a namespace (such as "/hello") for DNCP purpose, and CCN-DNCP client 200 is preconfigured (by the CCN stack running on the machine) with such a namespace. Note that if the pre-defined DNCP namespace is "/hello," the "HELLO" Interest has a name prefix as "/hello."

Forwarding module 210 is responsible for forwarding packets, such as Interests or Content Objects, to the various faces on CCN-DNCP client 200. According to CCN protocol, forwarding module 210 forwards Interests based on entries in FIB 214, and forwards Content Objects based on entries in the PIT (not shown in FIG. 2). In some embodiments, forwarding module 210 is configured to forward (or broadcast) the "HELLO" Interest to all faces on CCN-DNCP client 200. FIB 214 stores information for forwarding Interests. Entries in FIB 214 are often indexed by the name prefixes. In some embodiments, FIB 214 can be pre-populated (during the initialization process) with default entries, and forwarding module 210 can use those default entries to forward Interests.

Receiving module 212 is responsible for receiving, from the various faces, packets, which can include Interests and Content Objects. For example, receiving module 212 may receive a Content Object in response to a previously sent Interest. In some embodiments, receiving module 212 can receive responses to the "HELLO" Interest from a remote DNCP server. The DNCP response can include, but are not limited to: default entries for FIB 214, and namespaces for various services, such as device registration and discovery, service discovery, a resolution service for obtaining signing keys or hashes for content names, key services, printing services, and any other network services that are either in use today or may be discovered in the future.

A default entry for FIB 214 can specify the physical address of a default forwarder, which can be the DMZ (demilitarized zone) router and may have a MAC address 00:01:02:03:04:05. Hence, any Interest in the root namespace "/" can be forwarded to the default forwarder. Another default entry may specify the physical address of a local router and its matching namespace. For example, the additional default entry may map a name prefix "/abc" to a MAC address 12:34:56:78:9A:9B, meaning that all Interests in the "/abc" namespace should be forwarded to a face with MAC address 12:34:56:78:9A:9B.

Namespace configuration module 216 is responsible for configuring the namespaces on CCN-DNCP client 200 based on the DNCP response. Once the namespaces are configured correctly, Interest-generation module 208 is then able to generate various service requests (which are in forms of Interests) accordingly, and forwarding module 210 is able to forward those service requests to appropriate destinations. For example, if the DNCP response specifies that the namespace for device-discovery services provided in room 2015 is "/devices/room2015," then Interest-generation module 208 can generate an Interest with a name prefix "/devices/room2015," and forwarding module 210 can forward such an Interest based on the name prefix. In addition, the system may use substructure schemes to refine the device-discovery space based on the device types. For example, the namespace "/devices/room2015/thermometers" may be used to discover all thermometers in room 2015. Other additional namespaces can also be included in the DNCP response, thus allowing namespace configuration module 216 to configure those namespaces accordingly. For example, a network may include a printer, and the DNCP response to a new client device may state that the namespace for the printer service is "/abc/printer." When the new device attempts to print out a document, it can send its printing request to namespace "/abc/printer." Note that the forwarding information associated with the namespaces is stored in FIB 214.

Figure 3:
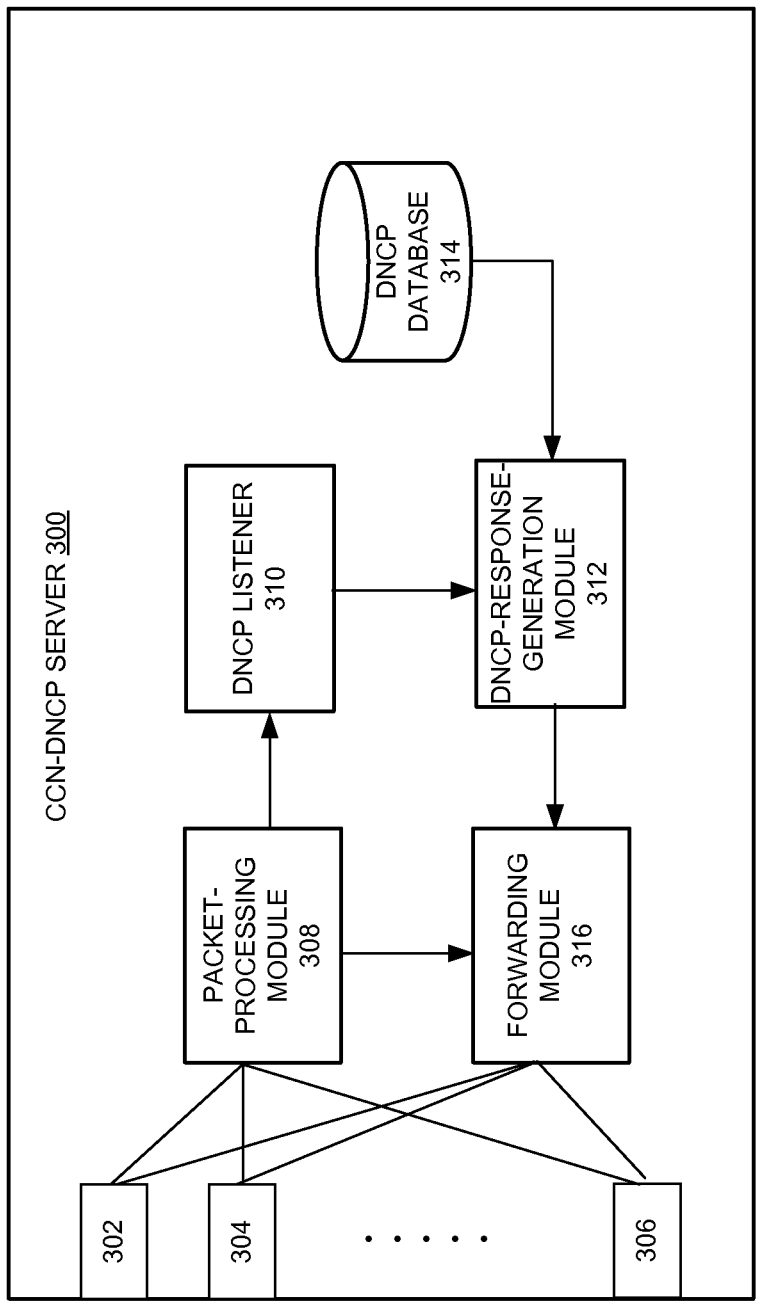
FIG. 3 presents a diagram presenting an exemplary architecture of a CCN-DNCP server, in accordance with an embodiment of the present invention.

FIG. 3 presents a diagram presenting an exemplary architecture of a CCN-DNCP server, in accordance with an embodiment of the present invention. In FIG. 3, CCN-DNCP server 300 includes a number of faces, such as faces 302, 304, and 306; a packet-processing module 308; a DNCP listener 310; a DNCP-response-generation module 312; a DNCP database 314; and a forwarding module 316.

Faces 302-306 are similar to faces 202-206, and can include both physical interfaces and application processes. Packet-processing module 308 is responsible for processing packets received on the various faces. In some embodiments, packet-processing module 308 extracts name prefix of the received packets. In further embodiments, if the name prefix of a received Interest is in the predetermined DNCP namespace (for example, the "/hello" namespace), packet-processing module 308 forwards the Interest to DNCP listener 310, which listens for Interest in the predetermined namespace. In the aforementioned example, the predetermined DNCP namespace is "/hello." When DNCP listener 310 receives a "HELLO" Interest message in the predetermined DNCP namespace, CCN-DNCP server 300 can determine that the node that sends the "HELLO" Interest is requesting DNCP service. In response to the DNCP request, DNCP-response-generation module 312 generates the appropriate DNCP response, in the form of a Content Packet, based on information stored in DNCP database 314. DNCP database 314 stores default FIB entries and various namespace configuration information, such as the namespace for device registration and discovery, the namespace for network service discovery, the namespace of a resolution service, the namespace of key services, etc. The namespace for device registration and discovery allows a client device to send registration or device-discovery Interest messages to a server. The service discovery namespace allows a client device to send Interest message in order to discover available network services. The namespace of a resolution service allows a client device to send Interest to the namespace in order to obtain publisher keys or hashes of content names. The namespace of the key services allows a client device to send Interest in order to obtain certified signing keys if the client device is not pre-loaded with certified keys. Note that because the network environment may change with time, the DNCP response packet may optionally include a lease time for each namespace, stating how long the namespace will remain valid. In such scenarios, the client device may need to periodically send DNCP Interest to ensure that their namespace configurations are still valid, and to update their namespace configurations when needed. Note that, because the client device has received previous DNCP response, it does not need to broadcast the DNCP Interest again, and can directly send the DNCP Interest to the DNCP service.

The generated DNCP response packet (as a Content Object) is forwarded back to the incoming face of the "HELLO" Interest by forwarding module 316 to ensure that the response packet is reverse-forwarded back to the originating node of the "HELLO" Interest.

There exists a situation where configuration information stored in DNCP database is too much for a single Content Object, or the configuration information may include multiple sectors some of which are essential for device operation and some of which may be optional. For example, the default FIB entries are essential configuration information, whereas the printer service may be optional. In some embodiments, DNCP-response-generation module 312 may generate a DNCP Content Object that includes instructions for the client device to obtain additional configuration information. For example, when a client device sends a first "HELLO" Interest that is forwarded to CCN-DNCP server 300, DNCP-response-generation module 312 may generate a DNCP Content Object that includes the essential configuration information (such as default FIB entries and the namespace for device registration). The DNCP Content Object may also indicate more DNCP information available, and specify the namespace associated with the additional DNCP information. Hence, to obtain the additional information, the client device can send additional DNCP request to the specified namespace. For example, the initial DNCP response to a client device may indicate that printing service is available, and to obtain namespace for the printing service, the client device needs to send a new "HELLO" Interest to the "/hello-1" namespace. Similarly, if the available DNCP information occupies multiple Content Objects, the first Content Object sent to the client device may indicate that the client device needs to send a new "HELLO" Interest to the "/hello-1" namespace to retrieve a subsequent Content Object.

Figure 4:
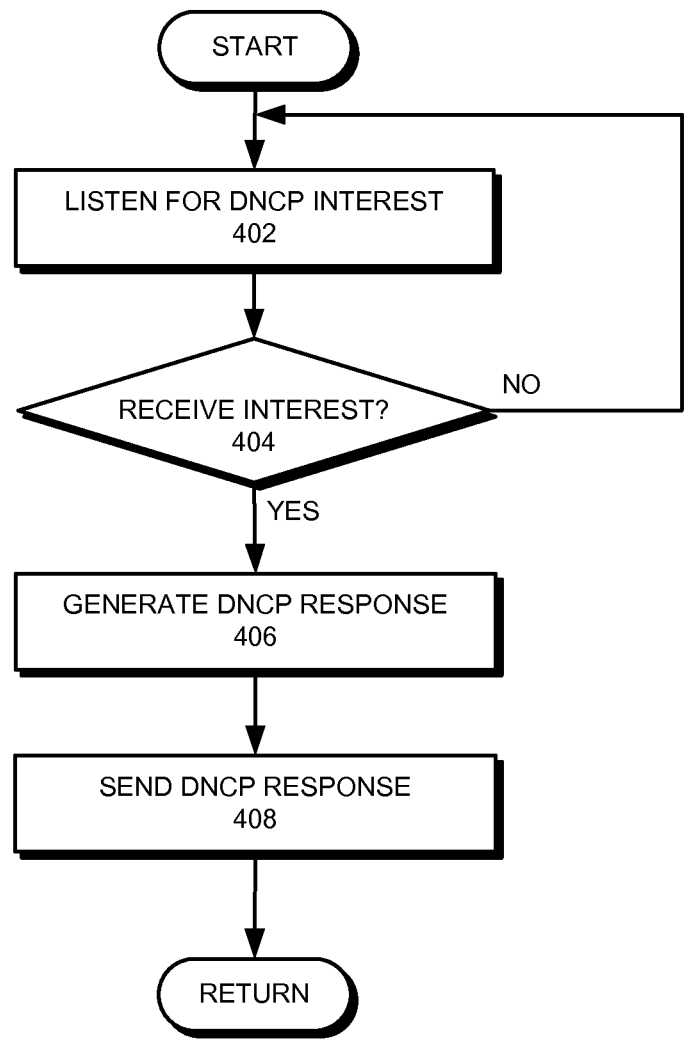
FIG. 4 presents a flowchart illustrating an exemplary server process for dynamic namespace configuration, in accordance with an embodiment of the present invention.

FIG. 4 presents a flowchart illustrating an exemplary server process for dynamic namespace configuration, in accordance with an embodiment of the present invention. During operation, the system listens for Interest in a predetermined namespace (operation 402), and determines whether a predetermined Interest with a name prefix in such a namespace is received from a client device (operation 404). For example, the predetermined namespace can be a DNCP namespace, such as "/hello," and the predetermined DNCP Interest can be a predefined "HELLO" packet. In some embodiments, the DNCP namespace and the format of the "HELLO" Interest are preconfigured by the CCN protocol running on the server and the client devices.

If the system receives a DNCP Interest, the system generates a DNCP response (operation 406), and sends the DNCP response back to the originating node of the DNCP Interest (operation 408). The DNCP response can include default FIB entries (such as a default face to which the client device can send its Interest) as well as namespaces for various services. In some embodiments, the DNCP Interest indicates the types of services requested by the client, and the DNCP response is generated based in the requested services. For example, the DNCP Interest may indicate that the originating node does not have a signing key. In response, the DNCP response includes the namespace of the key service, to which the client can send an Interest to obtain the signing key.

Figure 5:
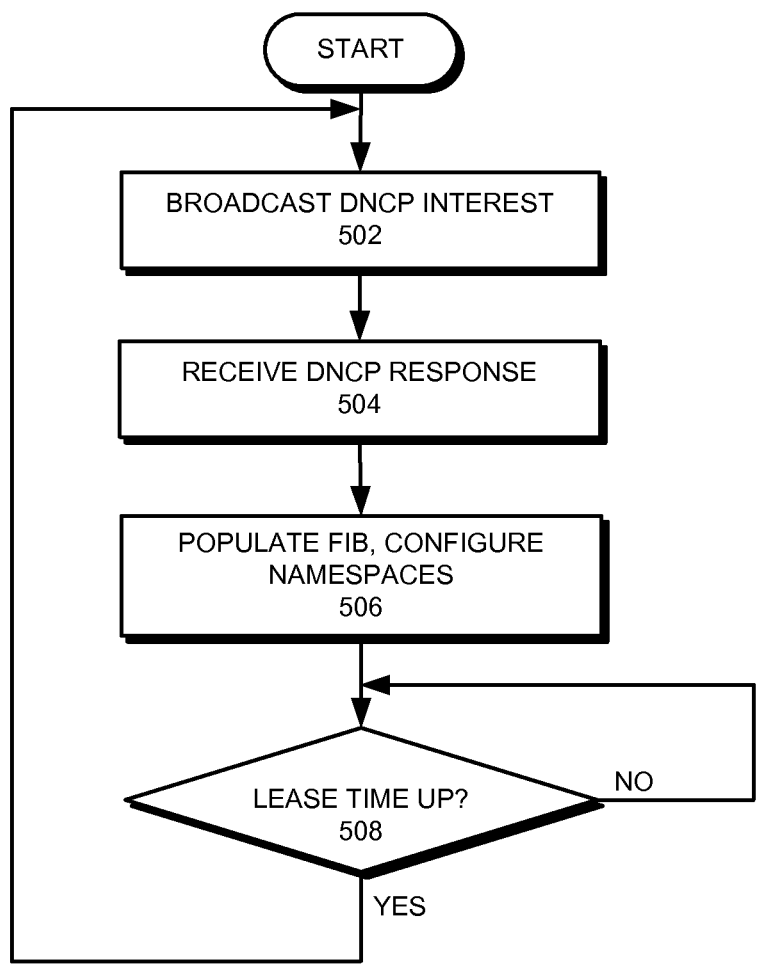
FIG. 5 presents a flowchart illustrating an exemplary client process for dynamic namespace configuration, in accordance with an embodiment of the present invention.

FIG. 5 presents a flowchart illustrating an exemplary client process for dynamic namespace configuration, in accordance with an embodiment of the present invention. During operation, a client device that joins a new environment or is brought-up online for the first time broadcast a DNCP request message on all of its faces (operation 502). In some embodiments, the DNCP request message is an Interest packet with a name prefix within a predefined namespace. The predefined namespace can be a namespace reserved specially for the DNCP service. For example, the system may reserve a namespace "/hello" for the DNCP service. The DNCP Interest or the "HELLO" Interest then has a name prefix "/hello." Note that because the DNCP Interest (or "HELLO" Interest) is broadcast on all faces of the client device, a DNCP service may either directly receives the "HELLO" Interest on one of its faces, or receives the "HELLO" Interest forwarded by other devices. In some embodiments, there exists other devices (such as other client devices) in the network environment that perform the task of a bridge or have the forwarding information set up in a way such that these devices can receive and forward the "HELLO" Interest to the DNCP service in a CCN network.

The client device then receives a DNCP response packet from the DNCP service (operation 504). The DNCP response packet is in the form of a Content Object. In some embodiments, the name of the DNCP Content Object matches the name of the Interest message, such as "/hello." The DNCP Content Object includes information that can be used to configure the client device, such as default FIB entries and various namespaces that can be used by the client device to obtain necessary services. Upon receiving the DNCP response, the client device populates its FIB with the default entries and configures its namespaces (operation 506). Note that once the FIB is populated with the default entries and the namespaces are configured, the client device would be able to generate Interest with the appropriate name prefix in order to obtain services.

In some embodiments, the namespace included in the DNCP response may have a lease time (such as a day or 10 days), meaning that they are valid only for a certain predetermined time period. In such scenarios, the client device may determine whether the lease time is up (operation 508), and resend the DCNP Interest to obtain up to date configuration setting (operation 502).

Note that in the examples shown in FIGS. 2-5, the DNCP request is answered by a DNCP server or a server process. In practice, it also possible to have the DNCP-response process running on a cluster of computers. Moreover, it is also possible to have other peer client computers in the CCN network to respond to the DNCP Interest. In some embodiments, a peer client machine can respond to a DNCP Interest with a Content Object that includes re-direction information. For example, the Content Object may provide an alternative DNCP namespace (which is different from the namespace of the DNCP Interest) to which the requesting client can send DNCP requests. This re-direction Content Object may also include configuration information of other client devices in the CCN network. For example, a client device joining a CCN network sends a DNCP Interest to the "/hello" namespace, and receives a Content Object from an existing peer client device in the CCN network. The Content Object indicates that the new client device needs to send a new DNCP Interest to a namespace "/name-abc" to obtain configuration information. In addition, the Content Object may also state that other peer devices on the network use the "/device-discovery" namespace for registration of new devices and for discovery of other new devices on the network.

Computer and Communication System

Figure 6:
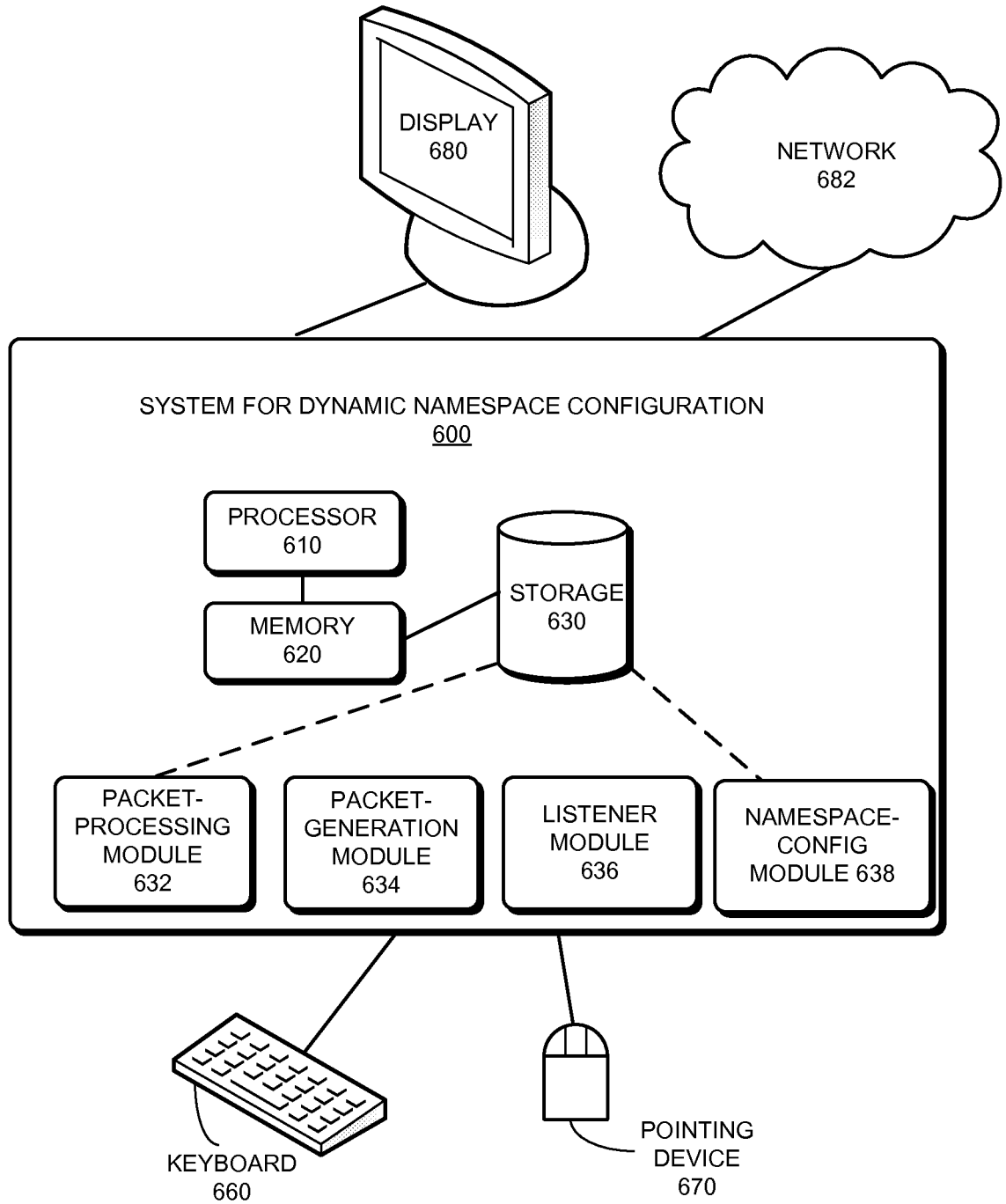
FIG. 6 illustrates an exemplary system for dynamic namespace configuration, in accordance with an embodiment.

FIG. 6 illustrates an exemplary system for dynamic namespace configuration, in accordance with an embodiment. A system 600 for dynamic namespace configuration comprises a processor 610, a memory 620, and a storage 630. Storage 630 typically stores instructions that can be loaded into memory 620 and executed by processor 610 to perform the methods mentioned above. In one embodiment, the instructions in storage 630 can implement a packet-processing module 632, a packet-generation module 634, a listener module 636, and a namespace-configuration module 638, all of which can be in communication with each other through various means.

In some embodiments, modules 632, 634, 636, and 638 can be partially or entirely implemented in hardware and can be part of processor 610. Further, in some embodiments, the system may not include a separate processor and memory. Instead, in addition to performing their specific tasks, modules 632, 634, 636, and 638, either separately or in concert, may be part of general- or special-purpose computation engines.

Storage 630 stores programs to be executed by processor 610. Specifically, storage 630 stores a program that implements a system (application) for dynamic configuration of the namespaces on client devices. During operation, the application program can be loaded from storage 630 into memory 620 and executed by processor 610. As a result, system 600 can perform the functions described above. System 600 can be coupled to an optional display 680 (which can be a touch screen display), keyboard 660, and pointing device 670, and can also be coupled via one or more network interfaces to network 682.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for automatic configuration of a device in a content-centric network (CCN), the method comprising:
   sending, by the device in the CCN, a predetermined Interest, wherein the predetermined Interest has a name prefix in a predetermined namespace;
   receiving a Content Object in response to the predetermined Interest, wherein the Content Object includes at least configuration information; and
   configuring the device based on the configuration information received in the Content Object, wherein configuring the device comprises:
   populating default entries in a Forwarding Information Base (FIB); and
   configuring one or more namespaces that correspond to one or more services.

2. The method of claim 1, wherein the one or more services include one or more of:
   a device registration service;
   a device discovery service;
   a service discovery service;
   a name resolution service;
   a service for obtaining or certifying signing keys; and
   a printing service.

3. The method of claim 1, further comprising broadcasting the predetermined Interest on faces of the device.

4. The method of claim 1, further comprising:
receiving, from a peer device, a second Content Object in response to the predetermined Interest, wherein the second Content Object includes redirection information to a configuration service, thereby facilitating the device to send an additional predetermined Interest to the configuration service.

5. The method of claim 1, wherein the Content Object further includes a lease time associated with at least one of the namespaces that correspond to the one or more services, indicating a predetermined time within which the at least one of the namespaces that correspond to the one or more services remain valid.

6. The method of claim 1, wherein the Content Object further includes a namespace associated with additional configuration information, thereby facilitating the device to send a subsequent Interest in the additional configuration information.

7. The method of claim 1, further comprising:
sending a second Interest, wherein the second Interest includes the one or more namespaces that correspond to the one or more services.

8. A computer-implemented method for automatic configuration of a device in a content-centric network (CCN), comprising:
listening, by a configuration server in the CCN, for a predetermined Interest, wherein the predetermined Interest has a name prefix in a predetermined namespace;
in response to receiving the predetermined Interest, generating a Content Object comprising configuration information for populating default entries in a Forwarding Information Base (FIB) and for configuring one or more namespaces that correspond to one or more services; and
sending the Content Object to the device, thereby facilitating configuration of the device based on the Content Object.

9. The method of claim 8, wherein the one or more services include one or more of:
a device registration service;
a device discovery service;
a service discovery service;
a name resolution service;
a service for obtaining or certifying signing keys; and
a printing service.

10. The method of claim 8, wherein the Content Object further includes a lease time associated with at least one of the namespaces that correspond to the one or more services, indicating a predetermined time within which the at least one of the namespaces that correspond to the one or more services remain valid.

11. The method of claim 8, wherein the Content Object further includes a namespace associated with additional configuration information, thereby facilitating the device to send a subsequent Interest in the additional configuration information.

12. A non-transitory computer-readable storage medium storing instructions that when executed by a device in a content-centric network (CCN) cause the device to perform a method for automatic configuration of the device, the method comprising:
sending, by the device in the CCN, a predetermined Interest, wherein the predetermined Interest has a name prefix in a predetermined namespace;
receiving a Content Object in response to the predetermined Interest, wherein the Content Object includes at least configuration information; and
configuring the device based on the configuration information received in the Content Object, wherein configuring the device comprises:
populating default entries in a Forwarding Information Base (FIB); and
configuring one or more namespaces that correspond to one or more services.

13. The computer-readable storage medium of claim 12, wherein the one or more services include one or more of:
a device registration service;
a device discovery service;
a service discovery service;
a name resolution service;
a service for obtaining or certifying signing keys; and
a printing service.

14. The computer-readable storage medium of claim 12, wherein the method further comprises broadcasting the predetermined Interest on faces of the device.

15. The computer-readable storage medium of claim 12, wherein the method further comprises:
receiving, from a peer device, a second Content Object in response to the predetermined Interest, wherein the second Content Object includes redirection information to a configuration service, thereby facilitating the device to send an additional predetermined Interest to the configuration service.

16. The computer-readable storage medium of claim 12, wherein the Content Object further includes a lease time associated with at least one of the namespaces that correspond to the one or more services, indicating a predetermined time within which the at least one of the namespaces that correspond to the one or more services remain valid.

17. The computer-readable storage medium of claim 12, wherein the Content Object further includes a namespace associated with additional configuration information, thereby facilitating the device to send a subsequent Interest in the additional configuration information.

18. The computer-readable storage medium of claim 12, further comprising:
sending a second Interest, wherein the second Interest includes the one or more namespaces that correspond to the one or more services.

19. A computer system for automatic configuration of a device in a content-centric network (CCN), the system comprising:
a processor; and
a storage device coupled to the processor and storing instructions which when executed by the processor cause the processor to perform a method, the method comprising:
listening for a predetermined Interest, wherein the predetermined Interest has a name prefix in a predetermined namespace;
in response to receiving the predetermined Interest, generating a Content Object comprising configuration information for populating default entries in a Forwarding Information Base (FIB) and for configuring one or more namespaces that correspond to one or more services; and
sending the Content Object to the device, thereby facilitating configuration of the device based on the Content Object.

20. The system of claim 19, wherein the one or more services include one or more of:

a device registration service;
a device discovery service;
a service discovery service;
a name resolution service;
a service for obtaining or certifying signing keys; and
a printing service.

\* \* \* \* \*